United States Patent [19]
Komiya

[11] Patent Number: 5,264,890
[45] Date of Patent: Nov. 23, 1993

[54] AUTOMATIC FOCUSING APPARATUS
[75] Inventor: Yasuhiro Komiya, Tokyo, Japan
[73] Assignee: Olympus Optical Co., Ltd., Tokyo, Japan
[21] Appl. No.: 996,785
[22] Filed: Dec. 24, 1992
[30] Foreign Application Priority Data Jan. 6, 1992 [JP] Japan .................. 4-000361

[51] Int. Cl.⁵ .............................................. G03B 13/36
[52] U.S. Cl. ...................................... 354/402; 358/227
[58] Field of Search ............................. 354/402–409; 358/227

[56] References Cited
U.S. PATENT DOCUMENTS 4,990,947  2/1991  Komiya et al. ..................... 354/402

Primary Examiner—W. B. Perkey
Attorney, Agent, or Firm—Frishauf, Holtz, Goodman & Woodward

[57] ABSTRACT

An image pickup element picks up an image formed by an optical system. A drive mechanism performs focus adjustment of the optical system on the basis of a signal output from the image pickup element. A storage unit stores MTF ratios corresponding to a plurality of spatial previously frequencies at each of two positions near a focal plane of the optical system in accordance with a defocus amount of the optical system, and to a predetermined value of characteristic values of the optical system. A converter converts the MTF ratio values stored in the storage unit in accordance with the characteristic value of the optical system. A first calculating unit calculates a ratio of the plurality of spatial frequency components corresponding to respective focusing states on the basis of a signal output from the image pickup element. A second calculating unit compares the calculated ratio of the spatial frequency components with the MTF ratio converted by the converter to calculate the defocus amount of the optical system. The drive mechanism drives the optical system in the axial direction in accordance with the defocus amount output from the second calculating unit and at least one of the characteristic values of the optical system.

17 Claims, 9 Drawing Sheets

| | SPATIAL FREQUENCY | | | | | |
|---|---|---|---|---|---|---|
| OBJECT DISTANCE | $u_1$ | $u_2$ | $u_3$ | $u_4$ | $u_5$ | $u_6$ |
| ∞ | $m_{01}$ | $m_{02}$ | $m_{03}$ | $m_{04}$ | $m_{05}$ | $m_{06}$ |
| 6.5 m | $m_{11}$ | $m_{12}$ | $m_{13}$ | $m_{14}$ | $m_{15}$ | $m_{16}$ |
| 3.2 m | $m_{21}$ | $m_{22}$ | $m_{23}$ | $m_{24}$ | $m_{25}$ | $m_{26}$ |
| 2.1 m | $m_{31}$ | | | | | |
| 1.6 m | | | | | | |
| 1.3 m | | | | | | |
| 1.06 m | | | | | | |
| 0.9 m | $m_{71}$ | $m_{72}$ | $m_{73}$ | $m_{74}$ | $m_{75}$ | $m_{76}$ |

OVERLAP PORTION WITH TABLE FORMED AT $A_1 = 10$ AND $A_2 = 40$ $\begin{cases} A_1 = 20 \\ A_2 = 50 \end{cases}$

FIG. 3

| | SPATIAL FREQUENCY | | | | | |
|---|---|---|---|---|---|---|
| DEFOCUS AMOUNT | $u_1$ | $u_2$ | $u_3$ | $u_4$ | $u_5$ | $u_6$ |
| -3 mm | $t_{11}$ | $t_{12}$ | $t_{13}$ | $t_{14}$ | $t_{15}$ | $t_{16}$ |
| -2.5 mm | $t_{21}$ | ---- | | | | |
| -2 mm | $t_{31}$ | ---- | | | | |
| -1.5 mm | | | | | | |
| -1 mm | | | | | | |
| 0 mm | | | | | | |
| 0.5 mm | | | | | | |
| 1 mm | | | | | | |
| 1.5 mm | | | | | | |
| 2 mm | | | | | | |
| 2.5 mm | | | | | | |
| 3 mm | | | | | | |
| 3.5 mm | ---------- | | | | | $t_{136}$ |

FIG. 4

|  | SPATIAL FREQUENCY | | | | | | ADDRESS CORRESPONDING TO PHOTOGRAPHIC OPTICAL SYSTEM |
|---|---|---|---|---|---|---|---|
|  | $u_1$ | $u_2$ | $u_3$ | $u_4$ | $u_5$ | $u_6$ |  |
| ∞ | $m_{11}$ | $m_{12}$ | $m_{13}$ | $m_{14}$ | $m_{15}$ | $m_{16}$ | 0 |
| 6.5 m | $m_{21}$ | $m_{22}$ | $m_{23}$ | $m_{24}$ | $m_{25}$ | $m_{26}$ | 10 |
| 3.2 m | $m_{31}$ | | | | | | 20 |
| 2.1 m | | | | | | | 30 |
| 1.6 m | | | | | | | 40 |
| 1.3 m | | | | | | | 50 |
| 1.06 m | | | | | | | 60 |
| 0.9 m | $m_{81}$ | $m_{82}$ | $m_{83}$ | $m_{84}$ | $m_{85}$ | $m_{86}$ | 70 |

OBJECT DISTANCE $\begin{cases} A_1 = 10 \\ A_2 = 40 \end{cases}$

F I G. 15
(PRIOR ART)

AUTOMATIC FOCUSING APPARATUS

BACKGROUND OF THE INVENTION

1. Field of the Invention

The present invention relates to an automatic focusing apparatus and, more particularly, to an automatic focusing apparatus for performing automatic focusing of a focal point of an optical device such as a camera.

2. Description of the Related Art

A patent concerning the technique of an automatic focusing apparatus using two images picked up in focusing states at two different positions has already been issued to the present inventors (U.S. Pat. No. 4,990,947). This technique will be briefly described with reference to FIGS. 13 and 14. Details of the above mentioned U.S. Patent will be incorporated therein.

Referring to FIG. 13, reference numeral 1 denotes a photographic optical system which is driven by a driver circuit 3 through a pulse motor 2. An image sensor 4 such as an interline CCD (Charge-Coupled Device) is arranged near the focal plane of the photographic optical system 1. An output signal from this image sensor 4 is output to a window circuit 5 for extracting an image signal corresponding to an area subjected to focusing.

A switching circuit 6 switches combinations of bandpass filters (to be referred to as BPFs or BPF hereinafter) 7a, 7b, and 7c and BPFs 8a, 8b, and 8c and supplies an output signal from the window circuit 5 to a predetermined one of the BPFs. Image signals having passed through the BPFs 7a and 8a, the BPFs 7b and 8b, and the BPFs 7c and 8c are supplied to power detectors 9a, 9b, and 9c for obtaining spatial frequency components of the input image signals. The power detectors 9a, 9b, and 9c output spatial frequency components $S_2$, $S_4$, and $S_6$ as their output signals. These output signals are input to hold circuits 10a, 10b, and 10c, respectively. The hold circuits 10a, 10b, and 10c output spatial frequency components $S_1$, $S_3$, and $S_5$.

Reference numerals 11a, 11b, and 11c denote dividers for calculating spatial frequency component ratios $Y_1$ ($=S_1/S_2$), $Y_2$ ($=S_3/S_4$), and $Y_3$ ($=S_5/S_6$) from the spatial frequency components $S_1$ to $S_6$. The spatial frequency component ratios $Y_1$, $Y_2$, and $Y_3$ are converted into digital signals $Y_{11}$, $Y_{12}$, and $Y_{13}$ by A/D (analog-to-digital) converters 12a, 12b, and 12c, respectively. The digital signals $Y_{11}$, $Y_{12}$, and $Y_{13}$ are input to latch circuits 13a, 13b, and 13c, respectively. The spatial frequency component ratios are input to an electronic scanning circuit 14. The electronic scanning circuit 14 compares the detected spatial frequency component ratios with MTF (Modulation Transfer Formation) ratios of the photographic optical system 1, which are calculated in respective focusing states in advance. The electronic scanning circuit 14 outputs a defocus amount D.

Reference numeral 15 in FIG. 13 denotes a microprocessor for performing focus adjustment. The microprocessor 15 outputs a clock pulse $\phi$ to the electronic scanning circuit 14, a drive control signal Cd for the photographic optical system 1 to the driver circuit 3, and a switching signal Cc for a combination of the BPFs 7a to 7c and 8a to 8c to the switching circuit 6.

FIG. 14 shows the circuit arrangement of the electronic scanning circuit 14. Referring to FIG. 14, reference numerals 16a, 16b, 16c, and 17 denote ROMs (Read-Only Memories). The ROMs 16a, 16b, and 16c store MTF ratios of N different focusing states at spatial frequencies $(u_1,u_{11})$, $(u_2,u_{12})$, and $(u_3,u_{13})$ (to be described later). The ROM 17 stores defocus amounts corresponding to these focus states. Storage values $d_1$ to $d_4$ at addresses designated by predetermined numbers of clock pulses $\phi$ are read out from the ROMs 16a to 16c and 17 through a counter 24. This indicates that the read access from these ROMs is performed by electronic scanning.

A signal Ss corresponding to differences between the MTF ratios output from the ROMs 16a to 16c and the spatial frequency component ratios $Y_{11}$, $Y_{12}$, and $Y_{13}$ output from the latch circuits 13a to 13c is obtained by subtracters 18a, 18b, and 18c, absolute value circuits 19a, 19b, and 19c, and an adder 20. In addition, the minimum value of the signal Ss is obtained by a differentiator 21 and a zero-crossing detector 22. The defocus amount D is obtained by a defocus amount detector 23 using the minimum value and the readout value d4 from the ROM 17.

The microprocessor 15 calculates a target stop position of the photographic optical system 1 in accordance with the detected defocus signal D and a present moving velocity V of the photographic optical system 1 and outputs a control signal Cd for focus adjustment. The pulse motor 2 is controlled and driven on the basis of the control signal Cd to adjust the movement of the photographic optical system 1. If the moving direction of the photographic optical system 1 is opposite to that described above, the photographic optical system is controlled to be moved in the opposite direction. If the target stop position is determined to be far away, the photographic optical system is moved at a velocity higher than the present moving velocity V. The first defocus amount adjustment is thus completed. When the photographic optical system comes close to the target position, the velocity is reset to V again, and the second defocus amount adjustment is performed in the same manner as in the first defocus amount adjustment. That is, an image pickup operation of each frame is performed by the image sensor 4, and the above arithmetic operations are performed on the basis of this image signal, thereby obtaining a defocus amount. In the second defocus amount adjustment, the high-frequency BPFs 17a to 19a, and values corresponding to $u_1$, $u_2$, and $u_3$ are used as the data from the ROMs 16a to 16c to calculate a defocus amount. The target stop position of the photographic optical system 1 is calculated again to adjust movement of the photographic optical system 1. When the photographic optical system reaches the target position, its movement is stopped, and focus adjustment is completed.

In the apparatus of FIG. 13, since the MTF ratio pattern of an image using MTF ratios corresponding to a plurality of frequencies at two different positions of the photographic optical system 1 is detected, the direction and amount of defocusing at an arbitrary position can be detected by one focus adjustment operation regardless of the state (features and brightness) of an object to be photographed.

In this automatic focusing apparatus, the MTF ratios in the N different focusing states are stored in the ROMs 16a to 16c, as described above. Each MTF ratio changes in accordance with the distance to the object, the distance between the two positions of the photographic optical system 1, the F-number of the photographic optical system 1, and the focal length of the photographic optical system 1. For this reason, the ROMs 16a to 16c must store MTF ratios upon various changes in these parameters.

For example, the MTF ratios stored in the ROMs 16a to 16c are stored in a table format shown in FIG. 15. MTF ratios $m_{11}$ to $m_{86}$ defined by object distances of $\infty$ to 0.9 m in the leftmost column and the spatial frequencies $u_1$ to $u_6$ in the uppermost row and the second column are stored. The rightmost column in FIG. 15 represents addresses 0 to 70 of the photographic optical system which correspond to the object distances. These addresses correspond to those of the ROM 17.

The table format in FIG. 15 is formed between address $A_1 = 10$ and address $A_2 = 40$ corresponding to the two positions of the photographic optical system 1. Focus detection is performed using this table format. This table format is determined by the following parameters:

(1) two addresses of the photographic optical system for picking up images at two different positions: $A_1$ and $A_2$
(2) focal length of the photographic optical system: f
(3) F-number of the photographic optical system: F That is, the MTF ratio table shown in FIG. 15 is required every time one of the above parameters changes. It is understood that the number of values of the MTF ratios to be stored is very large.

If digital data $Y_{11}$, $Y_{12}$, and $Y_{13}$ representing the frequency component ratios are 8-bit data, respectively, the number of focusing states is N = 256. The ROMs 16a to 16c store 512 (= 256 × 2) data.

SUMMARY OF THE INVENTION

It is, therefore, an object of the present invention to provide a new and improved automatic focusing apparatus in which prestored values of an MTF ratio table at a predetermined value of characteristic values of a photographic optical system are used to calculate table values of an MTF ratio having a different characteristic value so as to reduce the number of MTF ratio values to be stored.

According to one aspect of the present invention, there is provided an automatic focusing apparatus, comprising:

a photographic optical system, having a predetermined characteristic value, a focal plane, and an optical axis, for forming an optical image of an object to be photographed;

driving means for moving the photographic optical system in a direction of the optical axis;

image pickup means for detecting optical images of the object corresponding to a plurality of different focusing states formed by the photographic optical system;

storage means for prestoring MTF ratios respectively corresponding to a plurality of spatial frequencies at each of two positions near a focal plane of the photographic optical system in accordance with a defocus amount of the photographic optical system, the MTF ratios being stored in correspondence with a predetermined value of characteristic values of the photographic optical system;

spatial frequency component ratio calculating means for calculating a ratio of a plurality of spatial frequency components corresponding to the respective focusing states on the basis of signals output from the image pickup means in accordance with the plurality of different focusing states formed by the photographic optical system;

converting means for converting an MTF ratio value stored in the storage means, in accordance with the characteristic values of the photographic optical system;

defocus amount calculating means for comparing the MTF ratio converted by the converting means with the spatial frequency component ratio calculated by the spatial frequency component ratio calculating means to calculate the defocus amount of the photographic optical system; and control means for supplying a control signal for driving the photographic optical system by a predetermined amount in the direction of the optical axis of the photographic optical system in accordance with the defocus amount output from the defocus amount calculating means and the characteristic values of the photographic optical system.

Additional objects and advantages of the invention will be set forth in the description which follows, and in part will be obvious from the description, or may be learned by practice of the invention. The objects and advantages of the invention will be realized an obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a ROM table for explaining MTF ratios for the spatial frequencies of a photographic optical system;

FIG. 4 is a ROM table in which the MTF ratios by the automatic focusing apparatus of the present invention are stored;

FIG. 15 is a conventional ROM table format which stores MTF ratios.

DETAILED DESCRIPTION OF THE PREFERRED EMBODIMENTS

Figure 1:
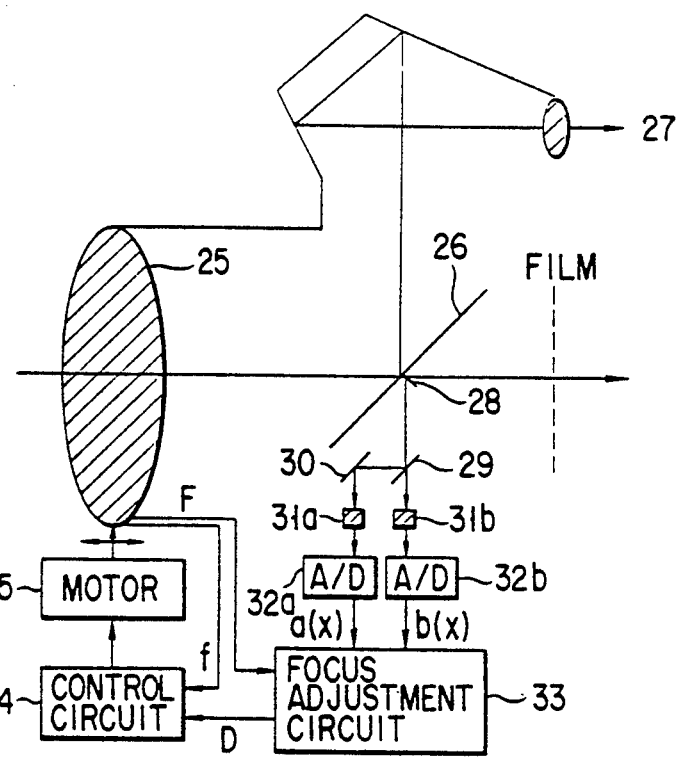
FIG. 1 is a view showing the overall arrangement of a single-lens reflex camera to which an automatic focusing apparatus of the present invention is applied.

Reference will now be made in detail to the presently preferred embodiments of the invention as illustrated in the accompanying drawings, in which like reference characters designate like or corresponding parts throughout the several drawings.

Embodiments of automatic focusing apparatuses according to the present invention will be described below.

MTF ratios corresponding to spatial frequencies of a photographic optical system will be described with reference to FIGS. 3 to 5.

Each conventional table format (FIG. 15) which stores MTF ratios is calculated for each of two addresses $A_1$ and $A_2$ of a given photographic optical system. If these two addresses $A_1$ and $A_2$ have a difference ($d_A$) therebetween, they can be expressed by one of the addresses. If the difference $d_A$ is kept constant and the address is changed ($A_1=20$, $A_2=50$), the resultant table format has a considerably large overlap portion, as indicated by a hatched region in FIG. 3 because the table format is formed with respect to object distances. Values in the overlap portion have the same actual defocus amount. If a table format is formed with respect to a defocus amount $\delta$ on the focal plane in place of the object distance, it is apparent that the overlap portion can be eliminated.

The absolute position of the photographic optical system in focus adjustment must be known to form the table format shown in FIG. 15. However, if a table format is to be formed with respect to the defocus amount $\delta$, only the table format with respect to an address difference $d_A$ need be formed, and the absolute position of the photographic optical system need not be known. That is, only the address difference $d_A$ need be known.

For this reason, it is apparent that a table format shown in FIG. 4 must be formed. This table format is obtained such that defocus amounts are calculated every 0.5 mm in the range of $-3.0$ mm to $+3.0$ mm as a function of the spatial frequency $u_i$ ($i=1$ to 6).

Figure 5:
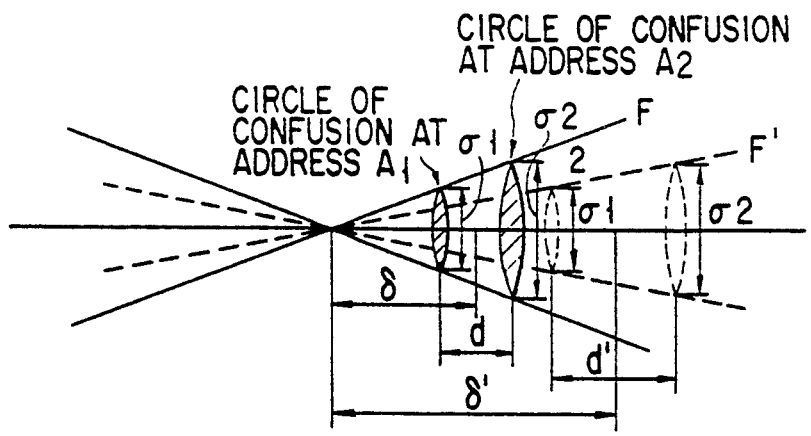
FIG. 5 is a view illustrating a focusing state near the focal plane of a point object.

The focusing state near the focal plane of the point object is illustrated, as shown in FIG. 5. Referring to FIG. 5, the diameters of circles of confusion picked up at the addresses $A_1$ and $A_2$ are defined as $\sigma_1$ and $\sigma_2$, their defocus amounts are defined as $\delta-(d/2)$ and $\delta+(d/2)$ where d is the distance between the circles of confusion, and an F-number is defined as F. In the area satisfying the above geometric approximation, MTF ratios depend on only the diameters of the circles of confusion. As indicated by broken lines in FIG. 5, even if the defocus amounts are defined as $\delta'-(d'/2)$ and $\delta'+(d'/2)$ and the F-number as F', the same MTF ratio is obtained if the diameters $\sigma_1$ and $\sigma_2$ are kept unchanged. This indicates that a considerably e number of overlap values are present even if the address difference $d_A$, and the F-number and the focal length of the photographic optical system are changed. The diameters $\sigma_1$ and $\sigma_2$ are expressed as follows:

$$\left.\begin{array}{l}\sigma_1 = \left(\delta - \frac{d}{2}\right)/F \\ \sigma_2 = \left(\delta - \frac{d}{2}\right)/F\end{array}\right\} \quad (1)$$

That is, the diameters $\sigma_1$ and $\sigma_2$ are found to depend on three parameters, i.e., $\delta$, d, and F.

MTF is approximated as the following Gaussian function:

$$\left.\begin{array}{l}M_1(u) = \exp\left(-\frac{\sigma_1^2 u^2}{2}\right) \\ M_2(u) = \exp\left(-\frac{\sigma_2^2 u^2}{2}\right)\end{array}\right\} \quad (2)$$

An MTF ratio T(u) can be defined as follows:

$$T(u) = \frac{M_1(u)}{M_2(u)} = \exp\left\{\frac{-(\sigma_1^2 - \sigma_2^2)u^2}{2}\right\} \quad (3)$$

When the MTF ratio is expressed using a natural logarithm, and $2/u^2$ is multiplied, the MTF ratio is given by:

$$T(u) = \frac{2}{u^2} \times \ln\frac{M_1(u)}{M_2(u)} = -(\sigma_1^2 - \sigma_2^2) \quad (4)$$

That is, the MTF ratio depends on only the diameters of the circles of confusion.

A substitution of equation (4) into equations (1) yields equation (5) as follows:

$$T(u) = -(\sigma_1^2 - \sigma_2^2) = 2\frac{\delta d}{F^2} \quad (5)$$

That is, the MTF ratio value does not depend on u, but is proportional to $\delta$ and d and is inversely proportional to $F^2$. If an F-number $F_0$ as a reference F-number and a difference $d_0$ as a reference difference are used to form a table $T_0(u)$, the MTF ratio T(u) can be obtained as equation (6) using F and d:

$$T(u) = \left(\frac{F_0}{F}\right)^2 \times \left(\frac{d}{d_0}\right) \times T_0(u) \quad (6)$$

$T_0(u)$ is given by equation (7) below:

$$T_0(u) = 2\frac{\sigma d_0}{F_0^2} \quad (7)$$

Although MTF is approximated as a Gaussian function only under the condition that the spatial frequency $\delta$ is low, a table at an arbitrary F-number and an arbitrary distance d can be formed in accordance with equation (6). That is, a table to be stored is only the table concerning $F_0$ and $d_0$, thereby greatly reducing the storage capacity. Note that the difference d can be obtained from the moving amount and focal length of the photographic optical system.

Figure 13:
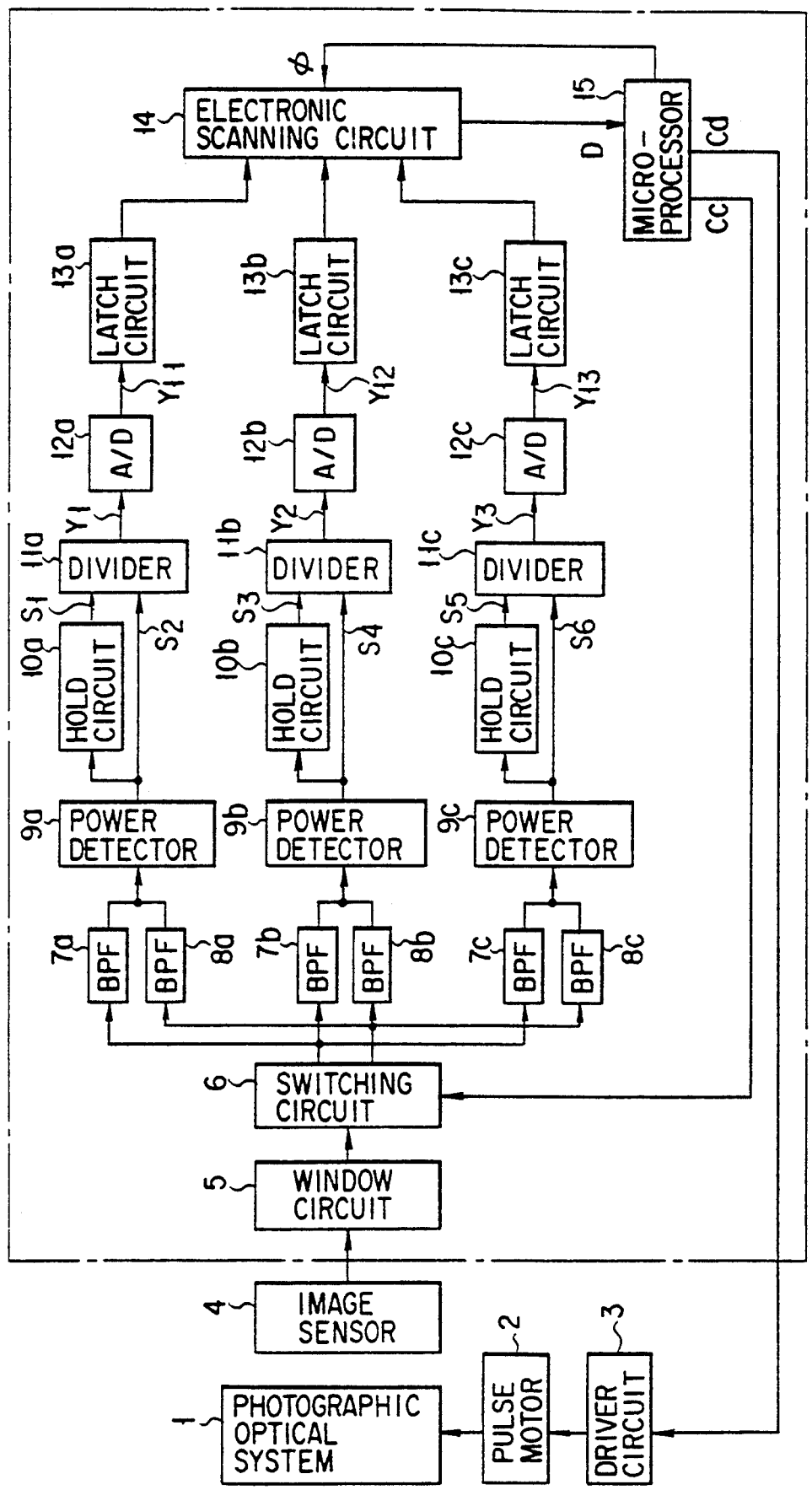
FIG. 13 is a block diagram showing an arrangement of a conventional automatic focusing apparatus.
Figure 14:
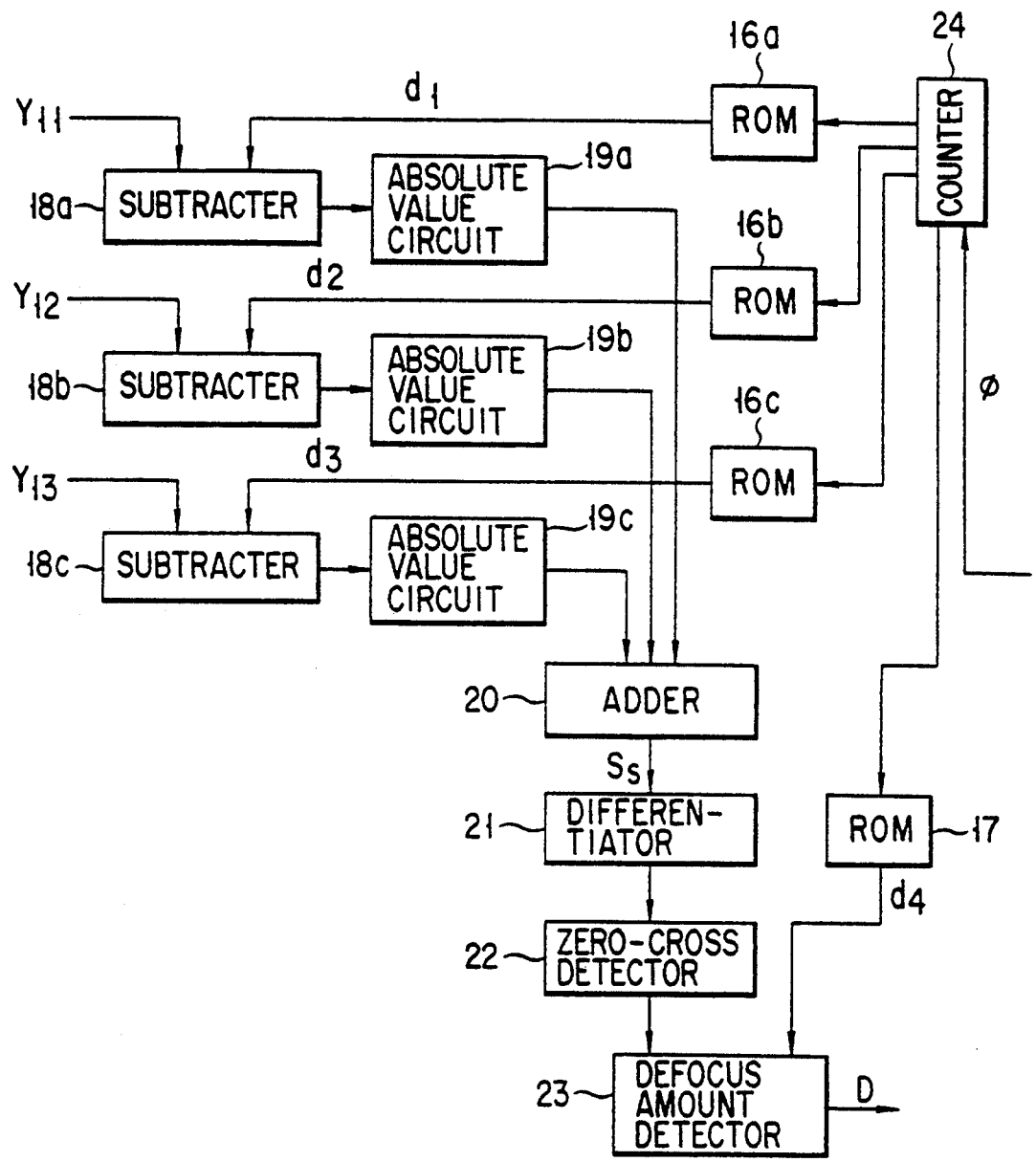
FIG. 14 is a block diagram showing a detailed arrangement of an electronic scanning circuit shown in FIG. 13.

The first embodiment of the present invention will be described below. Unlike the conventional example shown in FIG. 13, two image pickup elements (line sensors) are located at positions having different optical lengths, in place of obtaining two images in different focusing states upon movement of the photographic optical system.

FIG. 1 is a view showing the overall arrangement of a single-lens reflex camera to which the present invention is applied. Referring to FIG. 1, reference numeral 25 denotes a photographic optical system. A beam incident on the photographic optical system 25 is guided to a finder 27 through a main mirror 26 in a distance measurement mode. At the same time, part of the beam is also guided to a half mirror 29 through a submirror 28. A half of the beam is reflected by the half mirror 29 and is incident on a line sensor 31a through a full mirror 30. The remaining part of the beam is incident on a line sensor 31b.

The line sensors 31a and 31b are made of CCDs and are spaced apart from each other at a distance d/2 from an equivalent surface of a film so as to interpose the equivalent surface of the film. That is, the line sensors 31a and 31b are arranged to have a difference d between the optical lengths. The line sensors 31a and 31b are driven by a driver circuit (not shown) in focus adjustment. A/D converters 32a and 32b convert output signals from the line sensors 31a and 31b into digital signals, respectively. A focus adjustment circuit 33 detects a defocus amount D from image signals a(x) and b(x) (where x is the position of the line sensors) output from the A/D converters 32a and 32b and an F-number of the photographic optical system 25. The focus adjustment circuit 33 is constituted by a digital circuit such as a microprocessor.

Reference numeral 34 denotes a control circuit for driving a motor 35 so as to move the photographic optical system to an in-focus position in accordance with the defocus amount D and the focal length f.

Figure 2:
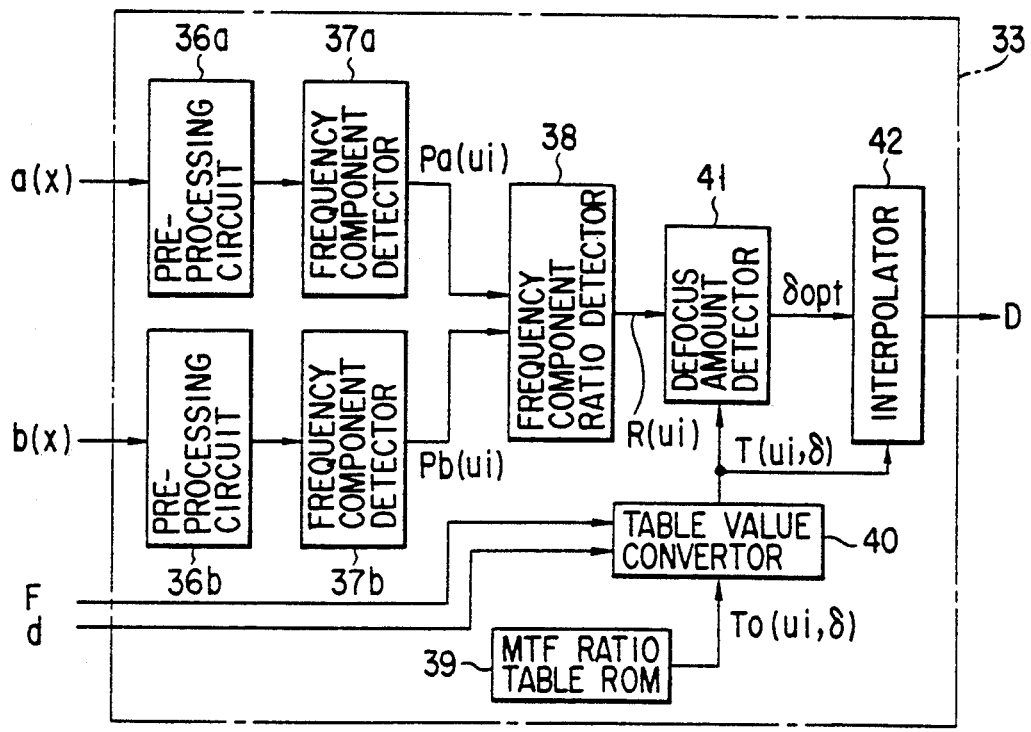
FIG. 2 is a block diagram showing the detailed arrangement of a focus adjustment circuit in FIG. 1.

FIG. 2 is a block diagram showing the detailed arrangement of the focus adjustment circuit 33. Preprocessing circuits 36a and 36b for preprocessing the image signals a(x) and b(x) perform brightness correction, magnification correction, and mask processing. These will be described in more detail below.

(i) Brightness Correction

For example, as indicated by equations (8), the brightness level differences caused by different amounts of light incident on the line sensors 31a and 31b are corrected as follows:

$$a'(x) = \frac{a(x) - M_a}{\sigma_a}$$
$$b'(x) = \frac{b(x) - M_b}{\sigma_b}$$
(8)

where $M_a$: the average value of $a(x)$
$\sigma_1$: the standard deviation of $a(x)$
$M_b$: the average value of $b(x)$
$\sigma_b$: the standard deviation of $b(x)$ (ii) Magnification Correction When the photographic optical system is in a defocus state, an image is out of focus, and its size is changed accordingly. In order to correct this, conversion represented by equations (9) is performed:

$$a'(x) = a\left(\frac{x}{S_a}\right)$$
$$b'(x) = b\left(\frac{x}{S_b}\right)$$
(9)

where $S_a$: the distance from the second principal plane to the line sensor 31a $S_b$: the distance from the second principal plane to the line sensor 31b (iii) Mask Processing When the defocus amount increases, images adjacent to each other overlap each other due to blurring, and the S/N ratio of the original signal is decreased. A weighting function $\omega(x)$ is multiplied as indicated by each of equations (10) to reduce the influence of overlapping. In this case, $\omega(x)$ is a Gaussian function:

$$a'(x) = a(x) \times \omega(x)$$
$$b'(x) = b(x) \times \omega(x)$$
(10)

Correction of variations in sensitivities of the line sensors may be performed in addition to (i) to (iii). Frequency component detectors 37a and 37b calculate power spectra of predetermined spatial frequencies such as spatial frequencies $u_i$ ($i = 1$ to 6) in accordance with various conventional techniques. The obtained power spectra are defined as $Pa(u_1)$ and $Pb(u_1)$. A frequency component ratio $R(u_i)$ is detected by a frequency component ratio detector 38, and a calculation represented by equation (11) is performed:

$$R(u_i) = H\left\{\frac{P_a(u_i)}{P_b(u_i)}\right\}$$
(11)

for $i = 1$ to 6

In the above equation, $H\{\ \}$ represents appropriate conversion and is given by conversion equation (12) below:

$$H\{r_{(u)}\} = \frac{2}{u^2} \ln\{r_{(u)}\}$$
(12)

An MTF ratio table ROM 39 stores MTF ratios calculated using the F-number $F_0$ and the difference $d_0$ in accordance with the defocus amount $\delta$ in the form of an MTF table. For example, as shown in FIG. 4, the MTF ratios converted by equation (12) are calculated at the spatial frequencies $u_i$ ($i = 1$ to 6) in the defocus amount range of $-3.0$ mm to $+3.0$ mm (every 0.5 mm). This table format is assumed to store the MTF ratios in the form of table values $T_0(u_i, \delta)$ ($i = 1$ to 6).

A table value converter 40 receives the table values $T_0(u_i, \delta)$ from the MTF ratio table ROM 39 and performs conversion based on equation (6) using the F-number F of the photographic optical system 25 and the difference d between the optical lengths of the line sensors 31a and 31b, thus deriving equation (13) below:

$$T(u_i,\delta) = \left(\frac{F_0}{F}\right)^2 \times \left(\frac{d}{d_0}\right) \times T_0(u_i,\delta) \qquad (13)$$

A defocus amount detector 41 compares each frequency component ratio $R(u_i)$ from the frequency component ratio detector 38 with each table value $T(u_i, \delta)$ from the table value converter 40 to obtain $\delta$ for providing a table value $T(u_i,\delta)$ closest to $R(u_i)$. More specifically, this can be expressed by equation (14) and $\delta$ which minimizes the difference is obtained:

$$\phi(\delta) = \sum_{i=1}^{6} |T(u_i,\delta) - R(u_i)| \qquad (14)$$

for $\delta = -3.0$ to $+3.0$ mm every 0.5 mm

The value $\phi(\delta)$ may be directly used as the defocus amount D. However, since the table value $T_0(u_i,\delta)$ is obtained by calculating 6 every 0.5 mm, the defocus amount D cannot be calculated with a precision of 0.5 mm or less.

For this reason, a table value is interpolated using an interpolator 42 in accordance with an output from the defocus amount detector 41 and an output from the table value converter 40, thereby improving the precision. A defocus amount k which minimizes the calculation result of equation (14) is defined as $\delta_{opt}$, and defocus amounts before and after the defocus amount $\delta_{opt}$ are defined as $\delta_{opt-1}$ and $\delta_{opt+1}$. More precise values can be obtained by the interpolation operations represented by equations (15) and (16) below:

If $\phi(\delta_{opt-1}) < \phi(\delta_{opt+1})$, $$\phi(\delta) = \sum_{i=1}^{6} |I\{T(u_i,\delta_{opt-1}), T(u_i,\delta_{opt}),\delta\} - R(u_i)| \qquad (15)$$

for $\delta = \delta_{opt-1}$ to $\delta_{opt}$ every 0.05 mm

If $\phi(\delta_{opt-1}) > \phi(\delta_{opt+1})$, $$\phi(\delta) = \Sigma |I\{T(u_i, \delta_{opt}), T(u_i,\delta_{opt+1}), \delta\} - R(u_i)| \qquad (16)$$

for $\delta = \delta_{opt}$ to $\delta_{opt+1}$ every 0.05 mm

In the above equations, I{ } represents the interpolation operation. In equation (15), linear interpolation is performed between $T(u_i,\delta_{opt-1})$ and $T(u_i,\delta_{opt+1})$ in accordance with $\delta$.

In equation (15), the defocus amount is calculated every 0.05 mm, and $\delta$ which minimizes $\phi(\delta)$ is output as the defocus amount D. Note that if $\phi(\delta_{opt-1}) = \phi(\delta_{opt+1})$, then $D = \delta_{opt}$.

An operation of the automatic focusing apparatus having the above arrangement will be described below.

When a release button (not shown) is depressed halfway, a series of focus adjustment operations of this camera are started. An optimal exposure amount is detected by a photometric system (not shown) to determine the exposure time of the line sensors 31a and 31b, thereby performing an image pickup operation. In this case, the photographic optical system 25 is kept stationary. Image signals read from the line sensors 31a and 31b are converted into digital signals by the A/D converters 32a and 32b. The digital signals are input to the focus adjustment circuit 33.

In the focus detection circuit 33, the preprocessors 36a and 36b perform the brightness correction, the magnification correction, the mask processing, and the like, as described above. The frequency component detectors 37a and 37b detect power spectra $Pa(u_i)$ and $Pb(u_i)$ (i=1 to 6) of the predetermined spatial frequencies, and the frequency component ratio detector 38 obtains the frequency component ratio $R(u_i)$.

On the other hand, the table value converter 40 converts the table values $T_0(u_i,\delta)$ stored in the MTF ratio table ROM 39 into $T(u_i,\delta)$ in accordance with the F-number F of the photographic optical system 2 and the difference d between the optical path lengths of the line sensors 31a and 31b. The defocus amount detector 41 detects $\delta_{opt}$ from $R(u_i)$ and $T(u_i,\delta)$ on the basis of equation (14). In addition, the interpolator 42 calculates the defocus amount D. The defocus amount D is output to the control circuit 34 for the motor 35. The motor 35 is driven to move the photographic optical system 25 to the in-focus position, thereby completing focus adjustment.

Note that the driving amount of the photographic optical system 25 is calculated in accordance with the defocus amount D and the focal length f.

If the defocus amount D is large, another image pickup operation is performed to detect a new defocus amount, and the photographic optical system 25 is moved to the in-focus position again.

In the above embodiment, the table values $T_0(u_i,\delta)$ were not converted in accordance with the focal length f because the optical path difference is not changed. If the differences d and $d_0$ between the optical paths of the line sensors coincide with each other, correction using d in the table value converter is not required in accordance with equation (13). Instead, if the focal lengths f are different from each other even with the same defocus amount D, driving amounts of the photographic optical system 25 are different from each other. Therefore, both D and f must be input to the control circuit 34.

As described above, in this embodiment, the table which stores the MTF ratios includes only 78 data, as shown in FIG. 4, thereby greatly reducing the number of data required in the conventional arrangement. Even if the F-number and the focal length are changed, the number of stored table values need not be increased by converting the table values or adjusting the moving amount of the photographic optical system.

In this embodiment, if the detected defocus amount is large, an image pickup operation is performed again upon focus adjustment to detect a new defocus amount. Focus adjustment using this new defocus amount is performed. Therefore, even if the defocus amount is large, high-precision focus adjustment can be performed. Still another defocus amount detection may be performed as needed.

Figure 6:
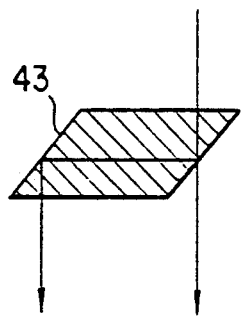
FIG. 6 is a view showing a prism used in place of a half mirror and a full mirror in FIG. 1.

A prism 43 shown in FIG. 6 may be used in place of the half mirror 29 and the full mirror 30 to split a beam into two optical paths.

Figure 7:
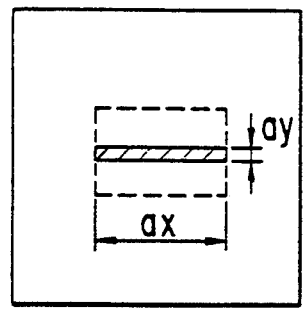
FIG. 7 is a view showing an image area which can be picked up by a line sensor.

FIG. 7 shows the area of an image capable of being picked up by the line sensor. A hatched portion illustrates the area of an image picked up by the line sensor. If the width of the line sensor is defined as $a_x$ and its height as $a_y$, condition $a_x >> a_y$ is established. The mask processing represented by equation (10) prevents overlapping of the image in the lateral direction in FIG. 7. That is, no countermeasure is taken for overlapping in the vertical direction. Simply, an area sensor represented by a dotted line is used as an image pickup element, and mask processing is performed in the vertical direction. However, when a two-dimensional sensor is used, the system cost is increased.

Figure 8:
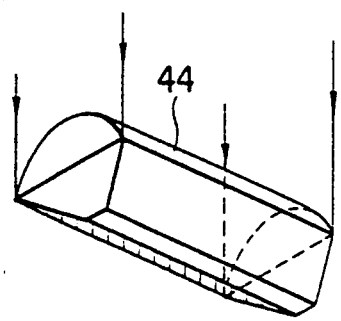
FIG. 8 is a perspective view showing a cylindrical lens located in front of the line sensor.

For this reason, as shown in FIG. 8, a cylindrical lens 44 is arranged in front of the line sensor to focus a beam to be focused within a range indicated by the dotted line in FIG. 7 so as to be incident on the line sensor portion represented by the hatched portion. The cylindrical lens 44 has a lower transmittance toward the peripheral portion to reduce the amount of light transmitted therethrough so as to perform mask processing in the vertical direction.

Figure 9:
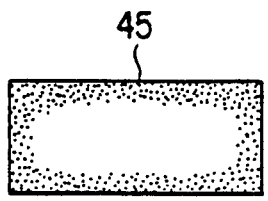
FIG. 9 is a view showing a film to be adhered to the lower surface of a transparent cylindrical lens.

If a filter 45 having a transmittance reduced away from its center is adhered to the lower surface of a cylindrical lens, as shown in FIG. 9, arithmetic mask processing can be omitted.

In this embodiment, two image pickup elements are used. However, only one image pickup element may be used, and the photographic optical system may be driven to obtain two images having different focusing states. In this case, the difference d can be set in accordance with the focal length f.

The second embodiment of the present invention will be described below. In the second embodiment, MTF ratio table values are corrected, as will be described with reference to FIGS. 10 and 11.

The MTF ratio conversion equation (6) used in the first embodiment is established when MTF can be approximated as a Gaussian function. However, when the defocus amount 6 or the spatial frequency u is increased, this approximation cannot be established.

Figure 11:
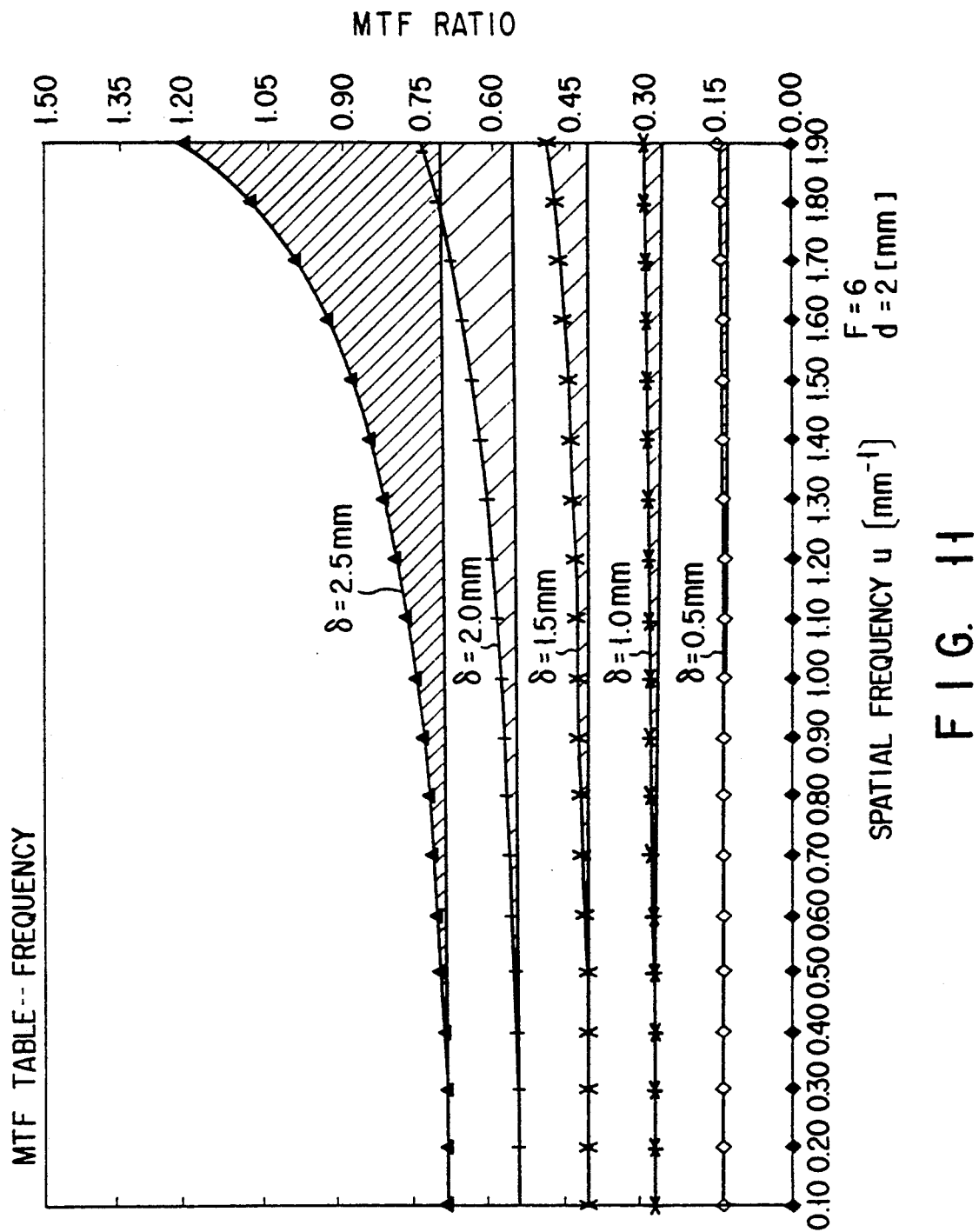
FIG. 11 is a graph showing the relationship between the lens MTF ratio and spatial frequency.

FIG. 11 shows MTF ratios calculated in accordance with equations (11) and (12). When $\delta$ or u is small, the MTF value is kept constant. However, when $\delta$ and u values are increased, as indicated by a hatched portion, the calculated values are deviated from the values approximated to the Gaussian function. If this deviation is defined as $C(u,\delta)$, an accurate MTF ratio value $Tt(u,\delta)$ is given by equation (17) below.

$$T_t(u,\delta) = T(u,\delta) + C(u,\delta) \quad (17)$$

where $T(u,\delta)$ represents the table value (Gaussian function approximated value) upon conversion using equation (6). That is, when the correction value $C(u,\delta)$ is added to the value obtained by the Gaussian function approximation, an accurate value is obtained. However, the correction value $C(u,\delta)$ changes upon changes in u and $\delta$ and in F and d. If all correction values $C(u,\delta)$ are stored, the number of data is almost equal to that of all original table values.

Referring to FIG. 11, it is proposed that the correction value $C(u,\delta)$ is approximated with an appropriate function because the hatched portion monotonously changes as a function of $\delta$ and u. For example, the correction value $C(u,\delta)$ can be approximated with a quadratic polynomial shown in equation (18):

$$C(u,\delta) = a_1 u^2 + a_2 u + a_3 \delta^2 + a_4 \delta \quad (18)$$

This means only four data $a_1$ to $a_4$ need be stored for a pair of F and d.

Figure 10:
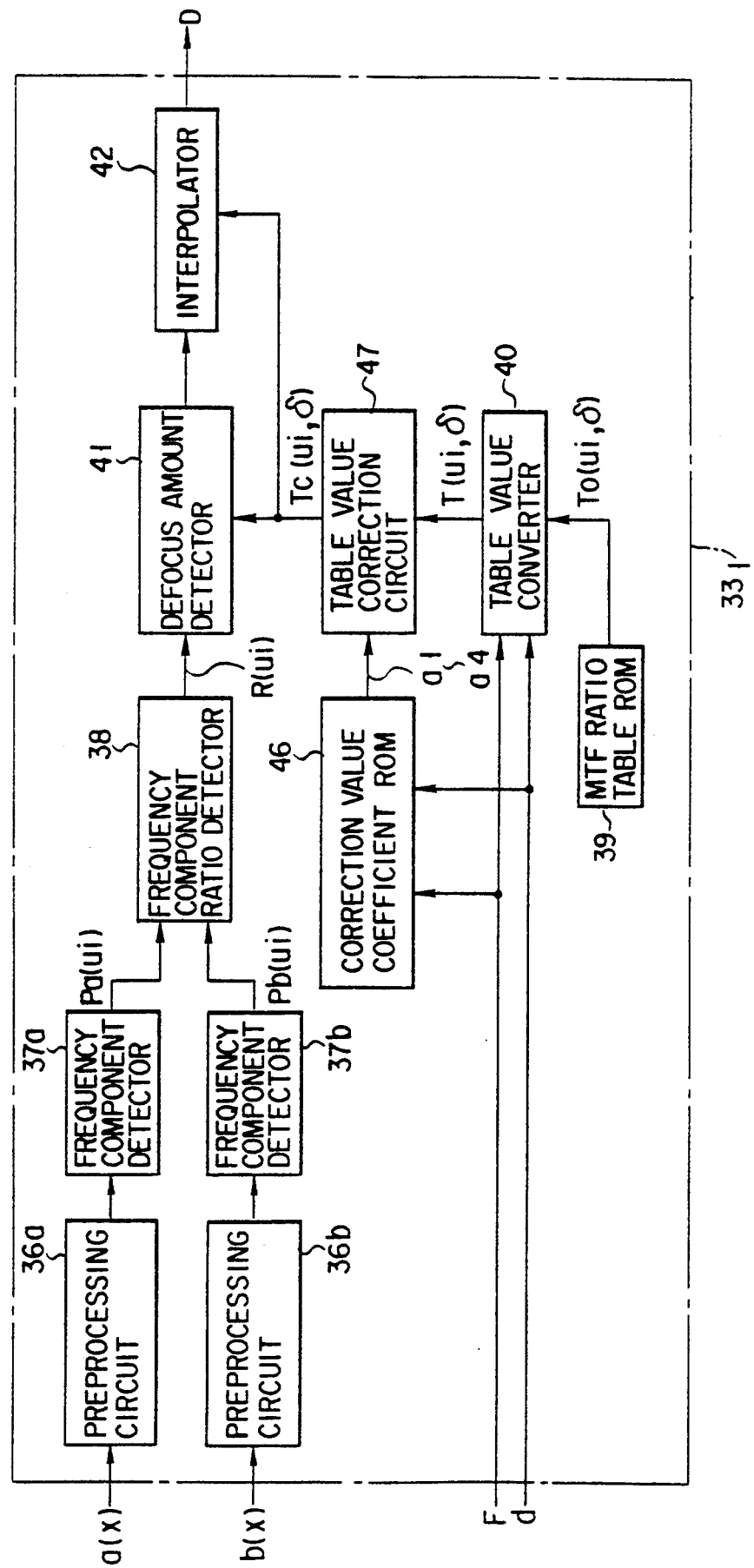
FIG. 10 is a block diagram showing an arrangement of a focus adjustment circuit according to the second embodiment of the present invention.

FIG. 10 is a block diagram of a focus adjustment circuit $33_1$ according to the second embodiment. The same reference numerals as in the first embodiment denote the same parts in the second embodiment, and a detailed description thereof will be omitted. A correction coefficient ROM 46 stores coefficients of equation (18). The correction coefficient ROM 46 outputs the coefficients $a_1$ to $a_4$ in accordance with F and d. A table value correction circuit 47 calculates a correction value C on the basis of equation (18) using the coefficients $a_1$ to $a_4$. The correction value C is added to the table value obtained by the Gaussian function approximation and output from a table value converter 40, thereby outputting a correct table value $Te(u_i,\delta)$.

The operation of the second embodiment is the same as that of the first embodiment except that table values are corrected.

In the second embodiment, the table values can be corrected even using a large defocus amount and a high spatial frequency. High-precision focus adjustment can be performed. In this correction, since the correction value is approximated with a simple function, the storage capacity required for correction need not be greatly increased.

Figure 12:
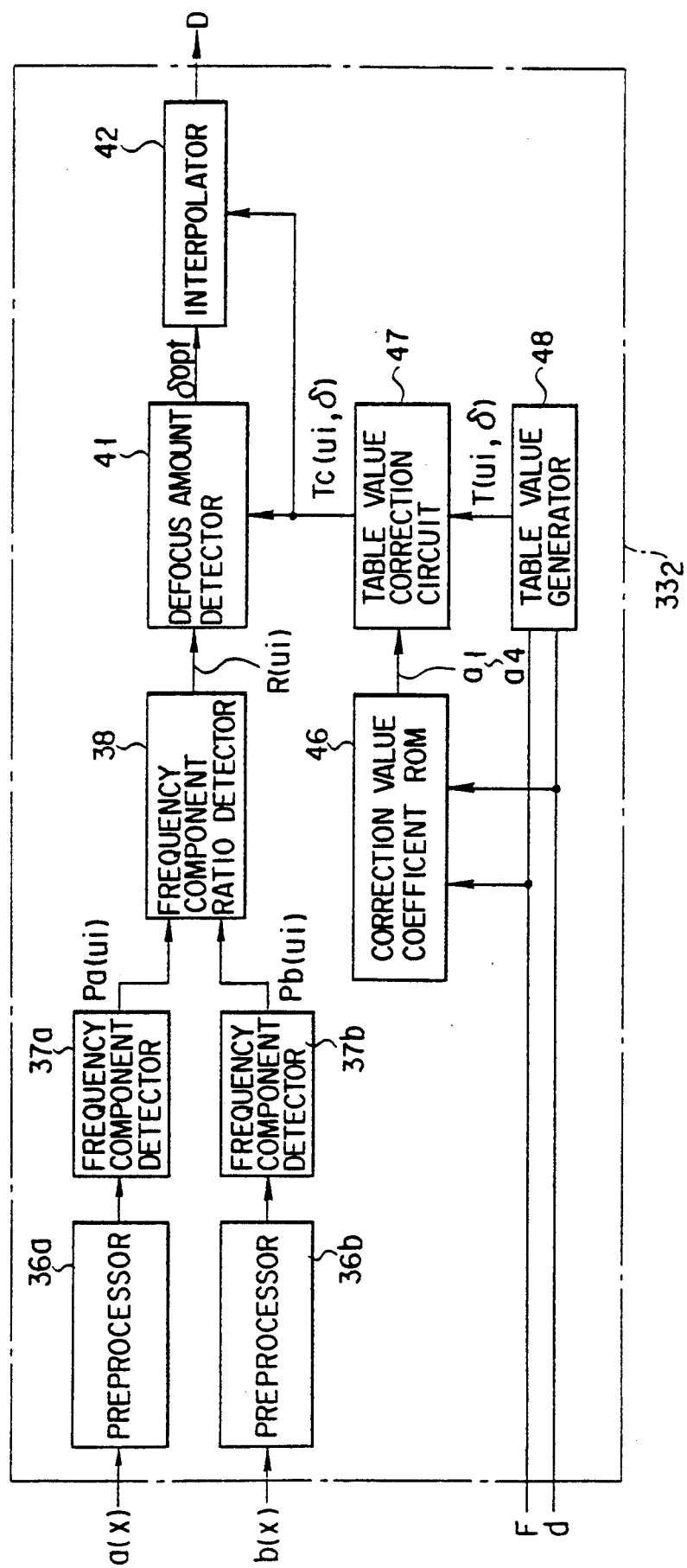
FIG. 12 is a block diagram showing an arrangement of a focus adjustment circuit according to the third embodiment of the present invention.

In this embodiment, the table value $T_0(u_1,\delta)$ calculated using the F-number $F_0$ and the difference $d_0$ is used. However, the table value can be calculated by equation (5). For this reason, as shown in a focus adjustment circuit $33_2$ in FIG. 12, a table value generator 48 may be used in place of the MTF ratio table ROM 39 and the table value converter 40. In this case, the MTF ratios need not be stored, and the storage capacity can be further reduced.

As has been described above, according to the present invention, prestored MTF ratio table values at a predetermined value of characteristic values of a photographic optical system in an automatic focusing apparatus are used to calculate MTF ratio table values for different characteristic values. The number of data to be stored can therefore be greatly reduced. In addition, in the automatic focusing apparatus of the present invention, if the calculated table value is different from an actual value, the calculated table value is corrected, thereby obtaining a more accurate table value.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An automatic focusing apparatus comprising:
   a photographic optical system, having a predetermined characteristic value, a focal plane, and an optical axis, for forming an optical image of an object to be photographed;
   driving means for moving said photographic optical system in a direction of the optical axis;
   image pickup means for detecting optical images of the object corresponding to a plurality of different focusing states formed by said photographic optical system;
   storage means for prestoring MTF ratios respectively corresponding to a plurality of spatial frequencies at each of two positions near a focal plane of said photographic optical system in accordance with a defocus amount of said photographic optical system, the MTF ratios being stored in correspondence with a predetermined value of characteristic values of said photographic optical system;
   spatial frequency component ratio calculating means for calculating a ratio of a plurality of spatial frequency components corresponding to the respective focusing states on the basis of signals output from said image pickup means in accordance with the plurality of different focusing states by formed said photographic optical system;

converting means for converting an MTF ratio value stored in said storage means, in accordance with the characteristic values of said photographic optical system;

defocus amount calculating means for comparing the MTF ratio converted by said converting means with the spatial frequency component ratio calculated by said spatial frequency component ratio calculating means to calculate the defocus amount of said photographic optical system; and control means for supplying a control signal for driving said photographic optical system by a predetermined amount in the direction of the optical axis of said photographic optical system in accordance with the defocus amount output from said defocus amount calculating means and the characteristic values of said photographic optical system.

2. An apparatus according to claim 1, wherein said image pickup means includes two line sensors arranged at positions having different optical path lengths by a predetermined distance.

3. An apparatus according to claim 2, wherein said apparatus further comprises preprocessing means for performing at least one processing operation of brightness correction, magnification correction, and mask processing for the image signals output from said two line sensors.

4. An apparatus according to claim 2, wherein said apparatus further comprises frequency component detecting means for detecting power spectra of predetermined spatial frequencies of the image signals output from said two line sensors.

5. An apparatus according to claim 1, wherein the predetermined characteristic value of said photographic optical system includes at least one of a focal length and an f-number of said photographic optical system.

6. An automatic focusing apparatus comprising:

a photographic optical system, having a predetermined characteristic value, a focal plane, and an optical axis, for forming an optical image of an object to be photographed;

driving means for moving said photographic optical system in a direction of the optical axis;

image pickup means for detecting optical images of the object corresponding to a plurality of different focusing states formed by photographic optical system;

storage means for prestoring MTF ratios respectively corresponding to a plurality of spatial frequencies at each of two positions near a focal plane of said photographic optical system in accordance with a defocus amount of said photographic optical system, the MTF ratios being stored in correspondence with a predetermined value of characteristic values of said photographic optical system;

spatial frequency component ratio calculating means for calculating a ratio of a plurality of spatial frequency components corresponding to the respective focusing states on the basis of signals output from said image pickup means in accordance with the plurality of different focusing states by formed said photographic optical system;

converting means for converting an MTF ratio value stored in said storage means, in accordance with the characteristic values of said photographic optical system;

correcting means for correcting the MTF ratio values output from said converting means in accordance with the characteristic values of said photographic optical system;

defocus amount calculating means for comparing the MTF ratio corrected by said correcting means with the spatial frequency component ratio calculated by said spatial frequency component ratio calculating means to calculate the defocus amount of said photographic optical system; and control means for supplying a control signal for driving said photographic optical system by a predetermined amount in the direction of the optical axis of said photographic optical system in accordance with the defocus amount output from said defocus amount calculating means and the characteristic values of said photographic optical system.

7. An apparatus according to claim 6, wherein said image pickup means includes two line sensors arranged at positions having different optical path lengths by a predetermined distance.

8. An apparatus according to claim 7, wherein said apparatus further comprises preprocessing means for performing at least one processing operation of brightness correction, magnification correction, and mask processing for the image signals output from said two line sensors.

9. An apparatus according to claim 7, wherein said apparatus further comprises frequency component detecting means for detecting power spectra of predetermined spatial frequencies of the image signals output from said two line sensors.

10. An apparatus according to claim 6, wherein the predetermined characteristic value of said photographic optical system includes at least one of a focal length and an F-number of said photographic optical system.

11. An apparatus according to claim 6, wherein said correcting means includes correction coefficient storage means for storing correction coefficients and correction amount calculating means for calculating a correction amount representing a polynomial including a defocus amount and a spatial frequency component as variables on the basis of the correction coefficients read out from said correction coefficient storage means in accordance with the characteristic value of said photographic optical system.

12. An automatic focusing apparatus comprising:

a photographic optical system, having a predetermined characteristic value, a focal plane, and an optical axis, for forming an optical image of an object to be photographed;

driving means for moving said photographic optical system in a direction of the optical axis;

image pickup means for detecting optical images of the object corresponding to a plurality of different focusing states formed by said photographic optical system;

spatial frequency component ratio calculating means for calculating a ratio of a plurality of spatial frequency components corresponding to the respective focusing states on the basis of signals output from said image pickup means in accordance the plurality of different focusing states by formed said photographic optical system;

MTF ratio calculating means for calculating MTF ratios corresponding to the plurality of spatial frequencies at each of two positions near a focal plane of said photographic optical system in accordance with a defocus amount of said photographic optical system and the characteristic value of said photographic optical system;

correcting means for correcting the MTF ratio values calculated by said MTR ratio calculating means in accordance with the characteristic values of said photographic optical system;

defocus amount calculating means for comparing the MTF ratio corrected by said correcting means with the spatial frequency component ratio calculated by said spatial frequency component ratio calculating means to calculate the defocus amount of said photographic optical system; and control means for supplying a control signal for driving said photographic optical system by a predetermined amount in the direction of the optical axis of said photographic optical system in accordance with the defocus amount output from said defocus amount calculating means and the characteristic values of said photographic optical system.

13. An apparatus according to claim 12, wherein said image pickup means includes two line sensors arranged at positions having different optical path lengths by a predetermined distance.

14. An apparatus according to claim 13, wherein said apparatus further comprises preprocessing means for performing at least one processing operation of brightness correction, magnification correction, and mask processing for the image signals output from said two line sensors.

15. An apparatus according to claim 13, wherein said apparatus further comprises frequency component detecting means for detecting power spectra of predetermined spatial frequencies of the image signals output from said two line sensors.

16. An apparatus according to claim 12, wherein the predetermined characteristic value of said photographic optical system includes at least one of a focal length and an f-number of said photographic optical system.

17. An apparatus according to claim 12, wherein said correcting means includes correction coefficient storage means for storing correction coefficients and correction amount calculating means for calculating a correction amount representing a polynomial including a defocus amount and a spatial frequency component as variables on the basis of the correction coefficients read out from said correction coefficient storage means in accordance with the characteristic value of said photographic optical system.

* * * * *